United States Patent

[11] 3,631,728

[72] Inventors Otakar P. Prachar
  Santa Barbara;
  Harold Shrout, Goleta, both of Calif.
[21] Appl. No. 32,092
[22] Filed Apr. 27, 1970
[45] Patented Jan. 4, 1972
[73] Assignee General Motors Corporation
  Detroit, Mich.

[54] SENSOR
  3 Claims, 4 Drawing Figs.
[52] U.S. Cl.............................................. 73/492,
  200/61.53, 102/78, 185/37
[51] Int. Cl....................................... G01p15/04,
  H01h 35/14
[50] Field of Search........................................ 73/492,
  503; 200/61.53, 61.45; 185/2, 4, 27, 37; 60/7 A, 8;
  102/78

[56] References Cited
  UNITED STATES PATENTS
  2,573,199 10/1951 Holman...................... 200/61.45 UX
  3,038,973 6/1962 Alpert........................... 200/61.45
  3,137,175 6/1964 Jamgochian................. 73/503
  3,337,701 8/1967 Prebilic....................... 200/61.45

*Primary Examiner*—Edgar W. Geoghegan
*Attorneys*—W. E. Finken and Herbert Furman ABSTRACT: A sensor wherein an operator such as a firing pin is resiliently biased in one axial direction within a guide tube toward actuated position. A plurality of balls freely received within apertures in the guide tube engage a radially outwardly tapered shoulder of the operator and a tapered annular internal wall of a seismic mass to hold the operator against movement. In the unidirectional embodiment of the sensor, the narrower opening of the tapered wall has a diameter less than the diametric distance between the points of tangency of any two of the balls with the tapered wall. The axial movement of the seismic mass under an acceleration pulse of predetermined amplitude and time forces the balls radially inwardly of the operator shoulder until the narrower opening of the tapered wall passes the balls and the balls are released to release the operator. In the bidirectional embodiment of the sensor, an asymmetrical tapered wall is joined to the first tapered wall and the balls are located in engagement with both walls at the juncture of the wider openings thereof when the seismic mass constrains the balls.

PATENTED JAN 4 1972 3,631,728

INVENTORS
Otakar P. Prachar, &
BY Harold Shrout
Herbert Furman
ATTORNEY

1

SENSOR

This invention relates to sensors and more particularly to sensors for sensing acceleration pulses in axial directions in a generally horizontal plane and releasing an operator, such as a firing pin, for movement toward an actuated position.

The sensor of this invention may either be unidirectional or bidirectional. Generally the sensor includes an operator slidable within a guide and axially biased toward an actuated position. The operator is constrained against movement by a plurality of balls which are freely received within openings in the guide and engage a shoulder of the operator. The balls are normally held against movement outwardly of the openings by engagement with a tapered annular wall of an axially movable seismic mass in the unidirectional embodiment and with asymmetrically tapered walls joined to each other in the bidirectional embodiment. In order for the balls to be released in either embodiment, the seismic mass must move relative to the guide tube through an axial integrating distance sufficient to locate the narrower opening of the tapered wall or of one of the walls axially past the balls. Since the seismic mass will not move through this axial distance unless it is subjected to an acceleration pulse of predetermined amplitude for a predetermined time, the balls are normally constrained against movement outwardly of guide apertures. The bias of the operation is transmitted to the seismic mass through the engagement of the balls with the operator shoulder and seismic mass wall and is normally sufficient to hold the seismic mass against movement in an axial direction until the predetermined pulse amplitude and time are reached. In order for the narrower opening of the seismic mass and the balls to pass each other, the internal wall first must force the balls inwardly of the apertures along the operator shoulder until the diametrical distance between the points of tangency of any two of the balls and the wall is decreased to and equals the diameter of the narrower opening.

One of the features of the sensor of this invention is that only a single biasing means is needed to bias the operator to actuated position and hold the seismic mass against movement in an axial direction until an acceleration pulse of predetermined amplitude for a predetermined time is received by the mass. Another feature is that the seismic mass is normally held against movement by the engagement of the balls with the tapered internal wall of the seismic mass under the bias of the operator. A further feature is that the sensor may be either unidirectional or bidirectional by either respectively providing the seismic mass with a single tapered internal wall or asymmetrically tapered internal walls joined to each other. These and other features of the sensor of this invention will be readily apparent from the following specification and drawings wherein:

Figure 1:
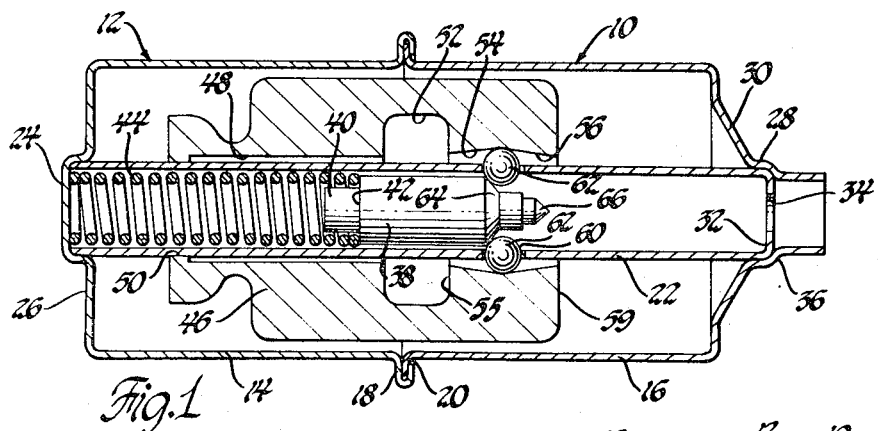
FIG. 1 is a longitudinal sectional view of a bidirectional embodiment of a sensor according to this invention in unactuated position.
Figure 2:
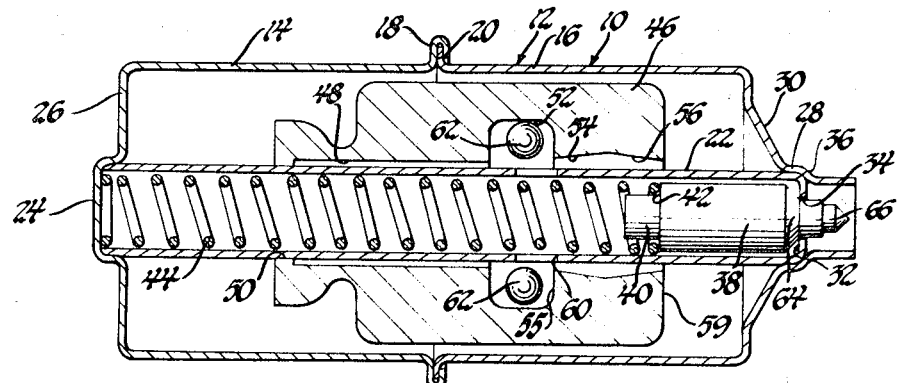
FIG. 2 is a view similar to FIG. 1 showing the sensor in actuated position.

Referring now to FIGS. 1 and 2 of the drawings, a sensor 10 according to this invention includes a cylindrical housing 12 which is provided by cylindrical or cup-shaped members 14 and 16. Member 14 includes a radial flange 18 hem flanged over a radial flange 20 of the member 16 to join the members to each other. A cylindrical guide 22 extends axially of the housing 12. One open end of the guide seats in a cylindrical boss 24 in the closed end wall 26 of the member 14. The other end of the guide fits within an offset axial flange 28 of a tapered boss 30 of member 16 to constrain the guide 22 against movement axially of the housing 12. A radial flange 32 at the other end of the guide defines an aperture 34 and engages a radially directed portion 36 of flange 28.

An operator or firing pin 38 includes an extension 40 which defines with the operator a radial shoulder 42. A coil compression spring 44 seats on the shoulder 42 and on the boss 24 to continually bias the operator 38 axially within the guide 22 toward actuated position or to the right thereof. An annular seismic mass member 46 of predetermined weight includes an internal annular bore 48 having a larger diameter than the OD of guide 22 and having a radially inwardly extending annular rib 50 at one end thereof which slidably engages the outer surface of the guide 22 to mount the one end of the seismic mass on the guide for movement axially thereof. The bore 48 opens to an internal annular groove 52 of generally rectangular cross section. An axially tapered annular wall 54 of the seismic mass opens at one end thereof to a sidewall 55 of groove 52 and is joined at the other end thereof to a like tapered asymmetrical wall 56 which opens to the radial wall 59 at the other end of the seismic mass.

The guide 22 includes three equally spaced circumferential apertures 60 through the wall thereof. A ball 62 is located in each aperture 60 and tangentially engages both walls 54 and 56 at the juncture thereof and also a radially outwardly tapered annular wall or shoulder 64 of the operator 38. The balls 62 radially locate the other end of the seismic mass with respect to guide 22 and also slidably support this other end of the mass on the guide.

The seismic mass 46 is of predetermined weight. The force of the spring 44 is transmitted to the seismic mass by the engagement of the balls 62 with both shoulder 64 and walls 54 and 56. Normally this force is sufficient to hold the mass 46 against axial movement until and unless an acceleration pulse of predetermined amplitude for a predetermined time is received by the mass. When such pulse is received, the mass 46 moves axially of the guide 22 to release the balls 62 and thereupon release the operator 38 as will now be described with reference to FIGS. 1 and 2.

Assume now that a pulse of predetermined amplitude is applied to the mass 46 for the required time to move the mass 46 in a right-hand direction. As the wall 54 moves relative to the balls 62, the balls 62 are forced inwardly of the apertures 60 along the shoulder 64 and against the bias of the spring 44. This will move the operator 38 slightly to the left until the wall 54 has forced the balls 62 sufficiently inwardly so that the distance between the points of tangential engagement of any two of the balls with wall 54 is equal to the diameter of the opening of the wall 54 to wall 56. The wall 54 will thereupon move past the balls 62 and the camming action of the shoulder 64 under the bias of spring 44 will thereupon cam the balls 62 radially outwardly of the opening 60 and into the groove 52 as shown in FIG. 2 to release the operator 38 for movement to the right under the action of the spring 44. The engagement of shoulder 64 with flange 32 provides a stop. The pointed end 66 of the operator 38 projects through opening 34, and although not shown in the drawings, can engage a detonator or a switch or any other mechanism or can puncture a diaphragm to in turn actuate a system, such as an air bag system.

It is believed apparent from the foregoing description that the application of a pulse of predetermined amplitude for the required time period to the seismic mass 46 to move the mass in a left-hand direction from that shown in FIG. 1 will likewise result in release of the balls 62 and the subsequent release of the operator 38. However, in such instance, the balls will be forced outwardly along the radial end wall 59 of the mass rather than along wall 56.

The distance between a plane containing the points of tangency of balls 62 with wall 54 and a plane containing wall 56 and likewise the distance between a plane containing the point of tangency of ball 62 with wall 56 and a plane containing wall 59 are equal in the embodiment shown and may be called integrating distances. The seismic mass 46 must move through one of these integrating distances in order for the operator 38 to be released. The weight of the seismic mass 46, the force of the spring 44 and the conical angles of walls 54 and 56 and shoulder 64 are arranged so that it will require a pulse of predetermined amplitude for a predetermined time before the mass 46 will move through one of the integrating distances and release the balls 62. In the specific embodiment shown, the walls 54 and 56 are at conical angles to the axis of tube 22 of approximately 8° although this angle may be varied as desired and the conical angles of the walls need not be the same. Likewise the integrating distances need not be the same.

The wedging action of the balls 62 against walls 54 and 56 and shoulder 64 serves the dual purpose of blocking movement of the operator 38 under the action of spring 44 and likewise blocking movement of the seismic mass 46 until the required pulse amplitude and time value are reached. Thus only a single spring is necessary to provide the motive force for moving the operator 38 and the motive force required to hold both the seismic mass and operator against movement.

Figure 3:
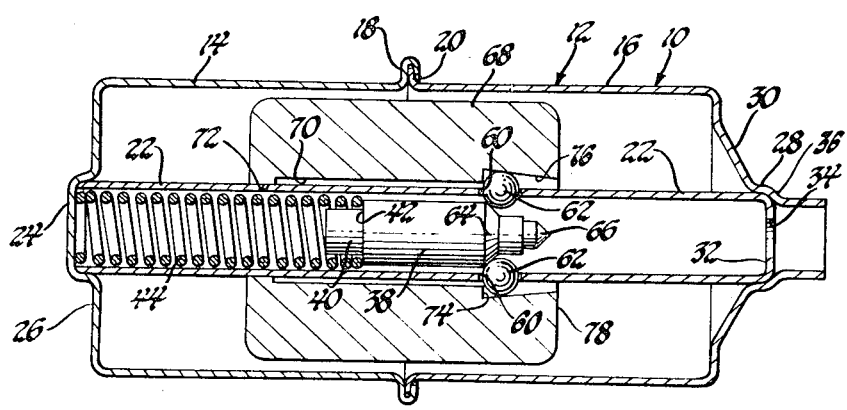
FIG. 3 is a longitudinal sectional view of a unidirectional embodiment of the sensor of this invention in unactuated position.
Figure 4:
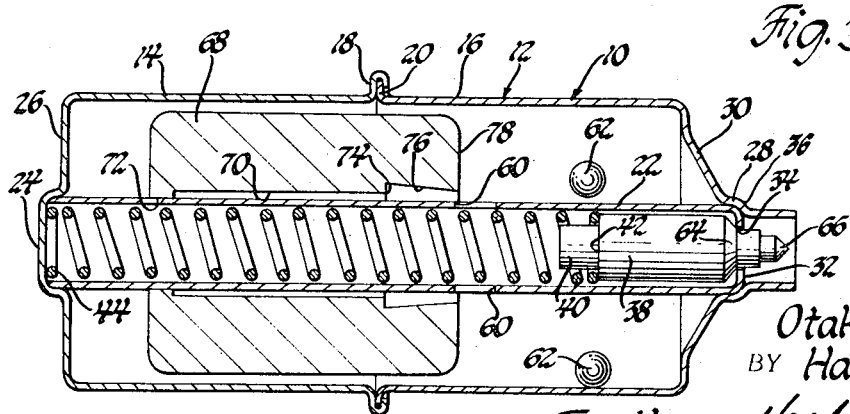
FIG. 4 is a view similar to FIG. 3 showing the sensor in actuated position.

FIGS. 3 and 4 show a unidirectional embodiment of the sensor and like numerals have been used for like parts. Generally the unidirectional embodiment differs from the bidirectional embodiment in that the seismic mass is provided with only one tapered internal annular wall. As shown particularly in FIGS. 3 and 4, the seismic mass 68 includes an internal annular bore 70 having at one end thereof an internal annular rib 72 which slidably engages the outer surface of the guide 22 to slidably support the one end of the seismic mass on the guide. The other end of the bore 70 opens to a radial wall 74 which merges into an axially tapered annular wall 76. Wall 76 opens to a radial wall 78 at the other end of the seismic mass. Normally the balls 62 engage the wall 74 intermediate the ends thereof although this need not necessarily occur.

Briefly, when a pulse of sufficient amplitude is applied for the required time to the mass 68 to move the mass in a left-hand direction, the wall 74 moves relative to the balls 62 as previously described in conjunction with wall 54. As soon as the wall 74 passes to the left of the balls 62, the operator 38 is thereupon released.

It is preferable that the walls 54, 56 and 74 be located with respect to the axis of the guide 22 at a conical angle greater than the normal angle of repose as determined by the sliding friction. In the embodiment shown, the conical angle is approximately 8°. If the angle is greater than this, the required pulse amplitude and time may be greater than desired and if the angle is less, the required pulse amplitude and time may be less than that desired.

Thus, this invention provides an improved sensor.

What is claimed is:

1. A sensor comprising, in combination, a support, a generally tubular axial guide having a plurality of circumferentially spaced radial apertures therethrough, an annular seismic mass member of predetermined weight surrounding the guide, means on the mass member slidably engaging the guide, the mass member including at least one annular axially tapered wall of predetermined axial extent overlying the guide apertures, an operator slidably mounted within the guide and having a radially extending annular shoulder, resilient means biasing the operator is one axial direction within the guide, a plurality of balls, each respective to an aperture of the guide and freely received therein, the balls being engageable with the mass member tapered wall to locate the balls within the guide and in engagement with the operator shoulder to block axial movement of the operator, the narrower opening of the mass member tapered wall having a diameter less than the diametrical distance between the points of tangency of any two of the balls with the wall, the mass member wall being movable axially of the balls upon the mass member receiving a predetermined amplitude pulse for a predetermined time to cause the mass member wall to force the balls radially inwardly of the operator shoulder against the force of the resilient means as the mass member wall moves axially and out of engagement with the balls, the operator shoulder thereupon moving the balls outwardly of the guide apertures and out of engagement therewith.

2. A sensor comprising, in combination, a support, a generally tubular axial guide having a plurality of circumferentially spaced radial apertures therethrough, an annular seismic mass member of predetermined weight surrounding the guide, means on the mass member slidably engaging the guide, the mass member including a pair of annular oppositely tapered axial walls of predetermined axial extent overlying the guide apertures, an operator slidably mounted within the guide and having a radially extending annular shoulder, resilient means biasing the operator in one axial direction with the guide, a plurality of balls, each respective to an aperture of the guide and freely received therein, the balls being engageable with the mass member tapered walls to locate the balls within the guide and in engagement with the operator shoulder to block axial movement of the operator, the narrower openings of the mass member tapered walls having diameters less than the diametrical distance between the points of tangency of any two of the balls with the walls, one of the mass member walls being movable axially of the balls upon the mass member receiving a predetermined amplitude pulse for a predetermined time to cause the one mass member wall to force the balls radially inwardly of the operator shoulder against the force of the resilient means as the one mass member wall moves axially and out of engagement with the balls, the operator shoulder thereupon moving the balls outwardly of the guide apertures and out of engagement therewith.

3. A sensor comprising, in combination, a support, a generally tubular axial guide having a plurality of circumferentially spaced radial apertures therethrough, an annular seismic mass member of predetermined weight surround the guide, means adjacent one end of the mass member slidably engaging the guide, the mass member including an annular tapered wall of predetermined axial extent overlying the guide apertures, an operator slidably mounted within the guide and having a radial shoulder tapered axially in the same direction as the mass member wall but of greater angularity, resilient means biasing the operator in one axial direction within the guide, a plurality of balls, each respective to an aperture of the guide and freely received therein, the balls being wedgingly engageable with the mass member tapered wall and with the operator shoulder to block axial movement of the operator and hold the mass member against movement under G-loads below a predetermined value and time pulse, the narrower opening of the mass member tapered wall having a diameter less than the diametrical distance between the points of tangency of any two of the balls therewith, the mass member wall being movable axially of the balls upon the mass member receiving a predetermined amplitude pulse for a predetermined time to cause the mass member wall to force the balls radially inwardly of the operator shoulder against the force of the resilient means as the mass member wall moves axially and out of engagement with the balls, the operator shoulder thereupon moving the balls outwardly of the guide apertures and out of engagement therewith.

* * * * *

UNITED STATES PATENT OFFICE
CERTIFICATE OF CORRECTION

Patent No. 3,631,728              Dated January 4, 1972

Inventor(s) Otakar P. Prachar and Harold Shrout

It is certified that error appears in the above-identified patent and that said Letters Patent are hereby corrected as shown below:

Column 2, line 69, "wall" (second occurrence) should be deleted.

Column 4, line 18, "with" should read -- within --.
line 39, "surround" should read -- surrounding --.

Signed and sealed this 22nd day of August 1972.

(SEAL)
Attest:

EDWARD M. FLETCHER, JR.
Attesting Officer

ROBERT GOTTSCHALK
Commissioner of Patents